(12) United States Patent
Shearer

(10) Patent No.: US 8,639,737 B2
(45) Date of Patent: Jan. 28, 2014

(54) METHOD TO COMPUTE AN APPROXIMATION TO THE RECIPROCAL OF THE SQUARE ROOT OF A FLOATING POINT NUMBER IN IEEE FORMAT

(75) Inventor: James B. Shearer, Ossining, NY (US)

(73) Assignee: International Business Machines Corporation, Armonk, NY (US)

(*) Notice: Subject to any disclaimer, the term of this patent is extended or adjusted under 35 U.S.C. 154(b) by 1324 days.

(21) Appl. No.: 12/057,927

(22) Filed: Mar. 28, 2008

(65) Prior Publication Data

US 2008/0208945 A1 Aug. 28, 2008

Related U.S. Application Data

(63) Continuation of application No. 11/139,033, filed on May 27, 2005, now abandoned.

(51) Int. Cl.
*G06F 7/552* (2006.01)
*G06F 7/38* (2006.01)

(52) U.S. Cl.
USPC .......................................... 708/500; 708/502

(58) Field of Classification Search
USPC ............................................ 708/500, 502, 605
See application file for complete search history.

(56) References Cited

U.S. PATENT DOCUMENTS

| | | | | |
|---|---|---|---|---|
| 5,847,979 | A * | 12/1998 | Wong et al. | 708/500 |
| 6,941,334 | B2 * | 9/2005 | Rogenmoser et al. | 708/502 |
| 6,963,895 | B1 * | 11/2005 | Comstock | 708/502 |
| 2006/0184602 | A1 * | 8/2006 | Lutz et al. | 708/502 |

* cited by examiner

*Primary Examiner* — Chuong D Ngo
(74) *Attorney, Agent, or Firm* — Witham, Curtis, Christofferson & Cook, P.C.; Daniel P. Morris

(57) ABSTRACT

Approximations of reciprocal square roots are provided in IEEE floating point binary format by obtaining an index from an input value, accessing a pair of table values and performing a limited number of simple and rapidly performed manipulations. The maximum relative error in the approximation thus provided is less than $0.75/2^{(2k+1)}$ as compared with a maximum relative error of $1/2^{k+2}$ of known methods, where $2^k$ is the number of table entries.

6 Claims, 4 Drawing Sheets

METHOD TO COMPUTE AN APPROXIMATION TO THE RECIPROCAL OF THE SQUARE ROOT OF A FLOATING POINT NUMBER IN IEEE FORMAT

CROSS-REFERENCE TO RELATED APPLICATIONS

This application is a continuation of, and claims priority from, U.S. patent application Ser. No. 11/139,033 of the same title filed on May 27, 2005, now abandoned the entire disclosure of which is hereby incorporated by reference. This application is related to U.S. patent application Ser. No. 10/292,768 (now U.S. Pat. No. 7,080,112), assigned to the assignee of the present invention, the entire disclosure of which is hereby incorporated by reference.

BACKGROUND OF THE INVENTION

1. Field of the Invention

The present invention generally relates to floating point processors in high speed digital computers and, more particularly, to an improved method to compute an approximation of the reciprocal of the square root of a floating point number in the IEEE (Institute of Electrical and Electronics Engineers) format.

2. Description of the Prior Art

Floating point arithmetic units are commonly used in central processing units (CPUs) of digital computers, especially high performance superscalar processors such as reduced instruction set computers (RISC). An example of a RISC processor is the IBM PowerPC® used in the IBM RISC System/6000 computer. Such processors typically include an input/output (I/O) unit interfacing with an instruction/data cache and a branch processor, one or more fixed point processors and one or more floating point processors.

The semantics of floating point instructions has not been as clear cut as the semantics of the rest of the instruction set. To address this problem, the computer industry has standardized on the floating point format by IEEE standard 754-1985. The IEEE standard defines 32-bit and 64-bit floating point formats. Each consists of (from left to right) a sign bit, an e-bit exponent and an f-bit fraction. The exponent is assumed to be biased with bias $2^{(e-1)}-1$ and it is assumed that an implicit 1 is to be appended to the front (left) of the fraction. The IEEE 32-bit format has e=8 and f=23. The IEEE 64-bit format has e=11 and f=52. The present invention will work for these and similar formats (i.e. with different values for e and f). The IEEE standard also defines the result of arithmetic operations on floating point numbers in these formats.

Of the four basic arithmetic operations of addition, subtraction, multiplication, and division, division is the most difficult to implement efficiently. Further, the operation of division is substantially complicated when dividing by a number which is irrational, as is generally the case when the divisor is a root such as a square root, cube root, fourth root, etc. which cannot be expressed exactly in a number system having a given radix (e.g. decimal, binary, etc.). So-called numerical methods have thus been developed to make certain calculations such that the accuracy of an approximate result after a given amount of calculation can be evaluated. On the other hand, reductions in the cost of memory structures for computers have allowed tables of numbers to be stored and approximations to be made directly therefrom. Of course, the accuracy of any approximation made in such a way varies with the number of table entries since it is often the case that even when a table entry precisely corresponds to a number for which an approximation is desired, the corresponding table entry will be inexact (e.g. due to being an irrational number or a number which cannot be exactly expressed in a given radix) and the approximation will be less accurate between values of table entries with the error increasing with difference of a number from the nearest number for which there is a table entry. Therefore, there is a practical and unavoidable trade-off between accuracy of an estimation taken directly from a table or an approximation derived from a table entry and the number of table entries provided to cover a given range of numerical values.

Square roots and reciprocal square roots are among the types of operations for which approximations are often used. Other roots and reciprocal roots are also often derived by approximation but are encountered less frequently. Between square roots and reciprocal square roots, the latter are generally more useful because they can be used to generate more accurate approximations (to both the square root and reciprocal square root) by using floating point multiply and add/subtract operations while generating more accurate approximations from a square root approximation requires floating point divides which are much slower on current hardware. Also, a square root approximation can be derived from a reciprocal square root simply by multiplying the reciprocal square root approximation by the input. For this reason the RS/6000 architecture alluded to above defines a reciprocal square root approximation instruction and not a square root approximation instruction.

The accuracy of an approximation of the reciprocal of the square root of a number can be improved by computing and adding a correction term to an initial approximation. This means that high accuracy square roots and reciprocal square roots can be (and often are) computed by starting with an initial lower accuracy approximation and refining it. The IBM PowerPC® architecture defines an optional reciprocal square root estimate instruction to assist in the implementation of this approach for computing square roots and reciprocal square roots. The overall efficiency of this approach depends on how rapidly and accurately the initial approximation can be made. Accordingly, the problem of how to compute fast and accurate reciprocal approximations is well-recognized and a variety of hardware and software solutions have been proposed including those disclosed in U.S. Pat. Nos. 5,563,818; 6,163,791 and 6,240,433, as well as the U.S. Patent Application incorporated by reference above.

Since the result of such a calculation is an approximation, all solutions necessarily involve a trade-off between simplicity, speed of execution and accuracy. However, no previously known solution has provided a particularly good balance between these three performance factors. For example, a technique is known for computing an approximation of a reciprocal of a square root of a number beginning with an approximation from a table where the computation will yield a relative accuracy of about $1/2^{(k+2)}$ where $2^k$ is the number of table entries. However, while the error of such a calculation can, in theory, be made arbitrarily small by increasing k, for modest and practical table sizes, the calculated approximation may not be sufficiently accurate.

SUMMARY OF THE INVENTION

It is therefore an object of the present invention to provide a technique of computing an approximation of a reciprocal of a square root or fourth root of an arbitrary number with the result provided in a standard IEEE format; which technique is well-balanced between speed, simplicity and accuracy.

It is another object of the invention to provide a simple and rapidly executed technique of computing an approximation of a reciprocal of a square root of an arbitrary number with a relative accuracy of about $0.75/2^{(2k+1)}$, where $2^k$ is the number of table entries.

In order to accomplish these and other objects of the invention, a method for computing an approximation of a reciprocal square root, reciprocal fourth root or square root of a binary floating point number is provided, comprising steps of extracting an index comprising selected bits of a binary floating point number considered as a binary integer, deriving a binary integer and a binary floating point number from a table in accordance with the index, performing a shift operation on the binary floating point number considered as a binary integer to form a shifted binary integer, subtracting the shifted binary integer from the binary integer derived from the table, and multiplying the binary floating point number derived from the table by a result of the subtracting step to provide the approximation.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 1A:
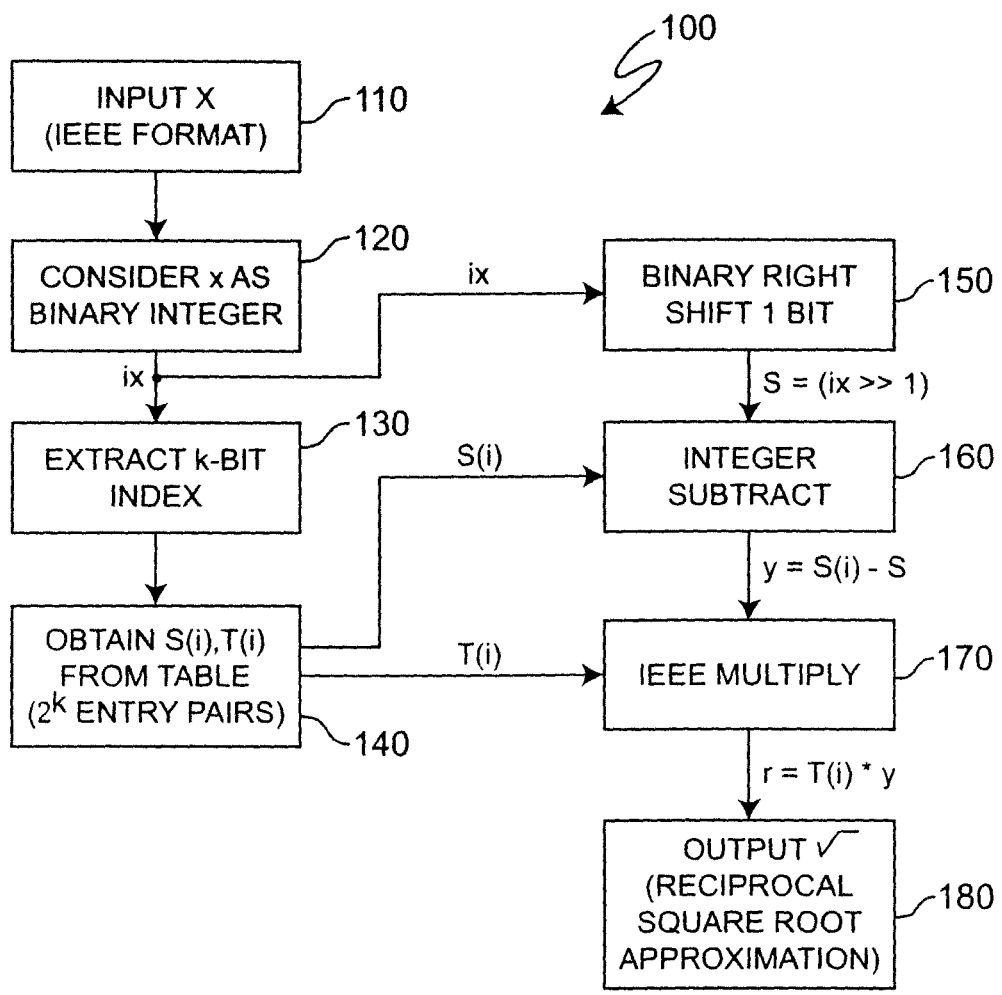
FIGS. 1A and 1B are block diagrams or high level flow charts of the principal components and data flow of a computation in accordance with the invention.
Figure 1B:
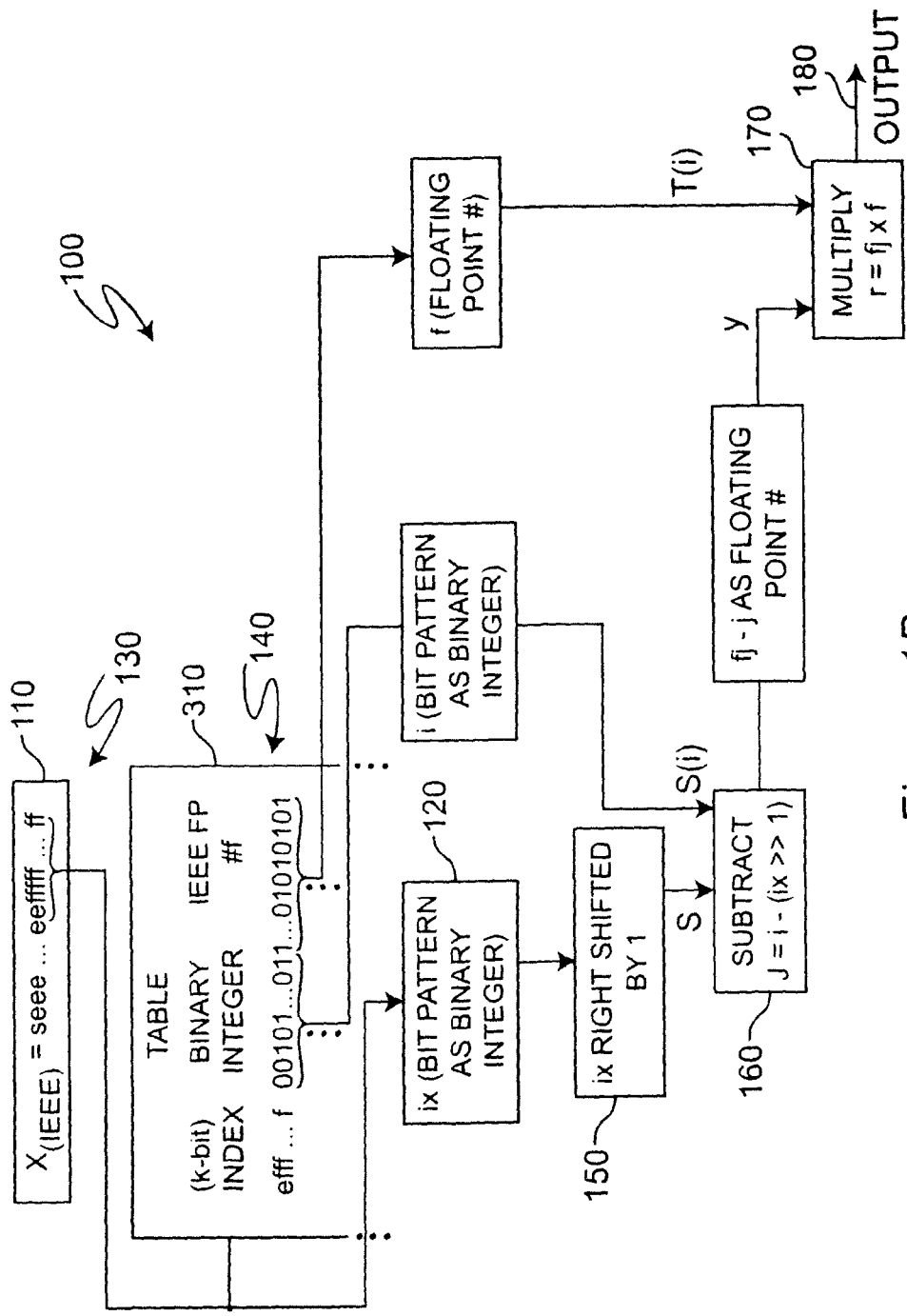

Referring now to the drawings, and more particularly to FIGS. 1A and 1B, a high-level overview of the architecture and methodology 100 of the invention is illustrated. Those skilled in the art will appreciate that, at the level of abstraction of FIGS. 1A and 1B, the Figures can be understood as either a block diagram of the particular processing elements employed as well as depicting the data flow in the course of processing to calculate an approximation of a square root or reciprocal square root of an arbitrary number. The same apparatus or method can be used with relatively slight modification, as will be discussed below to derive approximations of fourth roots, eighth roots, sixteenth roots and the like and their reciprocals but these approximations are not commonly needed. The invention can also be used to generate roots and reciprocal roots which are not powers of two but requires substitution of an integer divide for the simple integer right shift which suffices for roots and their reciprocals which are powers of two. It will also be appreciated that FIGS. 1A and 1B depict the same processing and data flow but FIG. 1B includes additional detail in regard to bit manipulations and use of a look-up table in accordance with the invention. A comparison of FIGS. 1A and 1B will also be of assistance in understanding that the invention may consider a bit pattern of or contained in a floating point number as a binary integer and vice-versa for purposes of computation or a subsequently performing bit manipulation even though there is, in fact, no transformation between a floating point number and a binary integer.

It should also be understood that while the invention will be described in terms of obtaining an approximation of a reciprocal of a square root of a number x (e.g. $1/\sqrt{x}$), the method and apparatus are equally applicable to approximations of square roots and, with some generalization as will be described below, fourth roots, as well. Therefore, references to a reciprocal square root (hereinafter sometimes rsqrt(number)) should be understood to be inclusive of square root and fourth root approximations. Again, using the invention for (reciprocal) nth roots requires integer division by n. When n is a power of two, $n=2^k$, this integer divide may be simply performed by a right shift by k and makes the invention most practical for cases where n is a power of two. Also, as noted above, reciprocal approximations are generally more useful since they can be more easily refined.

Further, as discussed above, it is assumed that the invention will employ a look-up table as alluded to above and that the look-up table will include $2^k$ entries. As is well-understood, an index of k bits will be sufficient to uniquely address each of the $2^k$ entries; each of which will include an integer S(i) and a number T(i) in a standard format.

Figure 3:
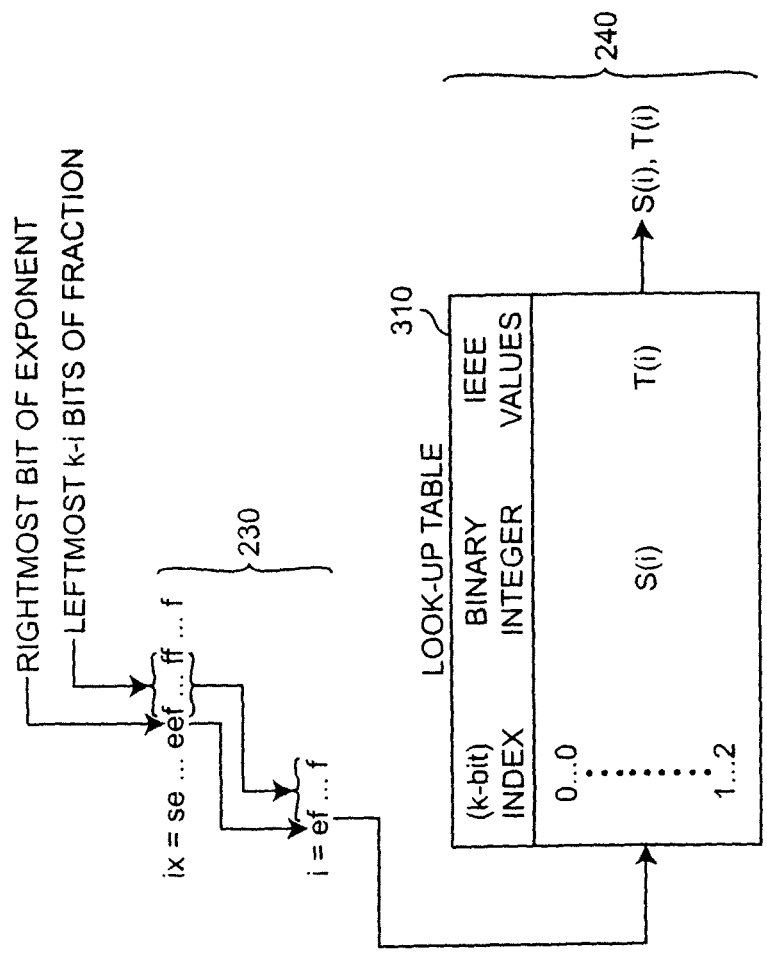
FIG. 3 is a diagram illustrating the Isolation or extraction of an index from a number and use of the index to access an entry in a look-up table.

The processing begins with the input 110 of a number x for which an approximation of the reciprocal square root is desired, generally to a register or the like. The number x should be in a standard format having a sign bit, a plurality of exponent bits and a plurality of fraction bits such as is provided in the preferred IEEE standard discussed above. While the standard specifies the significance of each bit, the number is represented simply as a bit pattern which may be considered as another form of data such as a binary integer as illustrated at 120. When x is considered as a binary integer it will be referred to herein as ix although it is to be understood that x and ix have identical bit patterns and no computation or manipulation whatsoever is required to obtain ix from x. Next, a k-bit pattern is extracted from ix (or the bit pattern of x) which includes the right-most/least significant exponent bit e and the left-most/most significant k−1 fraction bits f, as illustrated at 130. This k-bit pattern is than used as an index into a look-up table 310, as shown in greater detail in FIG. 3. The look-up table then returns a pair of numbers: a binary integer S(i) and a number T(i) in the desired standard format such as IEEE floating point format. The three numbers/bit patterns ix, S(i), and T(i) are sufficient to compute an approximation of the reciprocal square root of x in accordance with the invention as illustrated on the right side of FIG. 1A.

First, ix is shifted right by one bit for reciprocal square roots (or two bits for reciprocal fourth roots) as shown at 150 and the resulting bit pattern subtracted from S(i), output from the look-up table 310 as shown at 160. It should be noted that this manipulation does not involve any transformation of the bit pattern but only a shift of the bits which can be accomplished for a bit pattern of arbitrary length very quickly in, for example, a shift register.

That is, the shift and subtract operation is directed to two effects. The first is to obtain the correct exponent. IEEE double format can express numbers from about $10^{-300}$ to $10^{300}$ which would make a table-based approach impractical were it not for the fact that rsqrt $(x*y)$=rsqrt $(x)*$rsqrt $(y)$. Thus rsqrt $(2^n*x)$=rsqrt $(2^n)*$rsqrt $(x)$. The shift right by one bit (which is the same as dividing by two for positive binary integers) and subtract is changing n to $-n/2$ for the exponent part of the approximation and accommodates the bias term in IEEE format alluded to above. The need to right shift by two for reciprocal fourth roots and to add instead of subtract (or invert the subtraction) for square root and fourth roots logically follow from this observation.

The second effect of the shift and subtract operations is to prepare for the multiply operation to give a good approximation to rsqrt(x). For an interval (a,b), multiplying by a constant does not change the ratio of the end points of the interval. Thus, for each interval with index i, s(i) is chosen so that the end points after the subtract operation have the correct ratio. Doing so thus allows the multiply operation to provide a good approximation over the entire interval.

The subtraction operation can also be performed very quickly in a relatively simple logic array or by a processor. The result of the subtraction, y, is then multiplied by the floating point value T(i) supplied from the look-up table to produce r, the resulting approximation of the reciprocal square root of x, as illustrated at 170, which is then output, as illustrated at 180.

Figure 2:
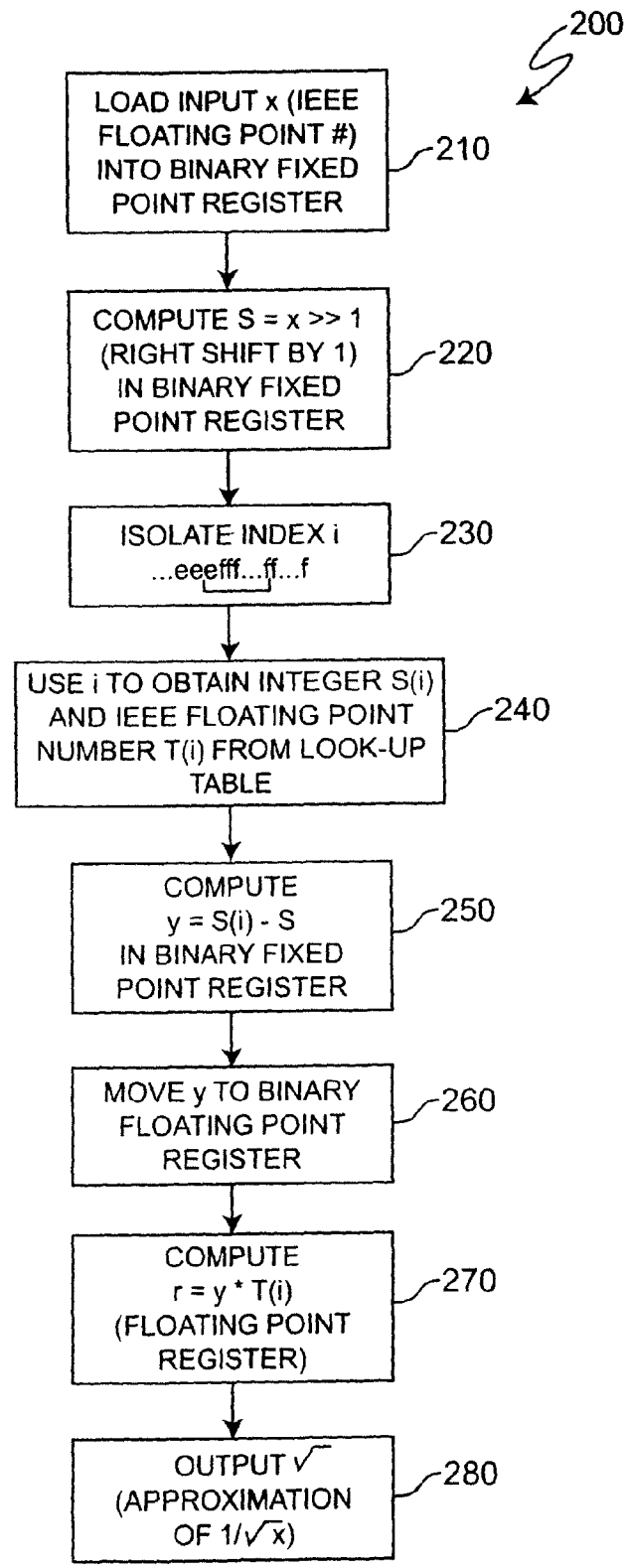
FIG. 2 is a flow chart corresponding to a preferred embodiment of the invention.

To summarize the above processing, FIG. 2 illustrates the basic steps of the method 200 discussed above. First, the input x is entered, preferably as an IEEE floating point number, into a binary fixed point register as shown at 210. Next, S=x>>1 is computed by a binary right shift of x in the binary faxed point register as shown at 220. The index, i, is then isolated from x using the right-most bit of the exponent portion of x and the left-most k−1 bits of the fraction portion of x, as shown at 230. The index, i, is then used to access an entry in look-up table 310 to find an integer S(i) and a floating point number T(i) in step 240. The isolation or extraction of index i (240) and the accessing of the look-up table to output S(i) and T(i) (240) are shown in greater detail in FIG. 3. The computation of an approximation of a reciprocal square root of x is then performed by computation of y=S(i)−S by integer subtraction, preferably in a binary fixed point register in step 250. The result, y, is then moved to a floating point register in step 260 and multiplied by floating point number T(i) output from the look-up table 310 when accessed by index, i, in step 240 to compute r=y*T(i) as shown at step 270. The reciprocal square root approximation, r, is then output in step 280.

It should be appreciated that the method described above is equally applicable to calculating approximations of square roots using different look-up table entries and changing the integer subtract 160 to an integer add or, alternatively, invert the subtraction to y=S−S(i) since the ranges or numbers for which particular approximation functions implemented by S(i) are the same as those specified by k-bit index i (e.g. the right-most exponent bit and the left-most K−1 fraction bits). Of course, the S(i) table entries for each index will differ and implement different approximation functions than were implemented for calculating reciprocal square roots. The values of T(i) for each entry will also differ for calculating approximations of square roots rather than reciprocal square roots. However, in practice, it may be preferable to generate an approximate square root from an approximate reciprocal square root by multiplying by the input, as noted above.

As alluded to above, the above calculation can be generalized for computing reciprocal fourth roots and other roots which are powers of two (or, with use of a multiplication or division rather than a right shift operation, reciprocal roots which are other than powers of two). The only modification required for other power of two roots or reciprocal power of two roots is in the isolation or extraction of index i and the number of bits of right shift. Specifically, for reciprocal fourth roots (sometimes referred to as a quadratic reciprocal), the k-bit index is taken as the right-most two bits of the exponent portion of x and the left-most k−2 bits of the fraction portion. The look-up table entries for S(i) and T(i) will also differ but the method is not otherwise modified.

It should be noted that the above computation can be completed with only one memory access, one bit pattern shift, one subtraction and one multiplication. While multiplication is more complex and requires more time for execution than binary addition or subtraction, multiplication is far less complex and much more rapidly executed than binary division. It can be shown that for properly chosen values for the look-up table entries, the relative error of the above technique is about $0.75/2^{(2k+1)}$, where $2^k$ is the number of table entries which is much less than the relative error of $1/2^{k+2}$ of the known method alluded to above. While that technique does not require a multiplication operation and thus may be executed somewhat more rapidly, the technique in accordance with the invention can provide far greater accuracy of the approximation for look-up tables of equal size or even comparable or somewhat improved accuracy with a much smaller look-up table. Therefore, it can be seen that the invention provides a much better balance between the performance qualities of simplicity, speed of execution and accuracy than has previously been available from known techniques.

While the invention has been described in terms of a single preferred embodiment, those skilled in the art will recognize that the invention can be practiced with modification within the spirit and scope of the appended claims.

The invention claimed is:

1. A method adapted to binary operations on a digital computer for balancing speed, simplicity and accuracy in computing an approximation of a reciprocal square root, reciprocal fourth root or square root of a binary floating point number, comprising steps of
    extracting by the digital computer an index comprising selected bits of said binary floating point number considered as a binary integer,
    accessing by the digital computer a binary integer and a binary floating point number from a table in a memory of the digital computer in accordance with said index, said indexed binary floating point number from said table being such as to yield an approximation of said reciprocal square root, reciprocal fourth root or square root, respectively, for said index when multiplied by a binary integer derived from said indexed binary integer,
    performing by the digital computer a shift operation on said binary floating point number considered as a binary integer to form a shifted binary integer,
    subtracting by the digital computer using said binary operations said shifted binary integer from said indexed binary integer obtained from said table in said accessing step, and
    multiplying by the digital computer using said binary operations said indexed binary floating point number by said binary integer derived in said subtracting step to provide said approximation,
    wherein the indexed binary integer from the table is chosen so that a ratio of end points of an interval of the table where the binary floating point number is located is not changed after the subtracting step.

2. A method as recited in claim 1, wherein said shifting operation is a right shift by one bit.

3. A method as recited in claim 2, wherein said extracting step comprises extracting one exponent bit and k−1 fraction bits from said binary floating point number considered as a binary integer.

4. A method as recited in claim 1, wherein said shifting operation is a right shift by two bits.

5. A method as recited in claim 4, wherein said extracting step comprises extracting two exponent bits and k−2 fraction bits from said binary floating point number considered as a binary integer.

6. A method for binary computing in a digital computer to approximate a reciprocal of a $2^{Nth}$ root of an IEEE format binary floating point number having, left to right, a sign bit, an e-bit exponent and an f-bit fraction, where N is a positive integer, comprising:

provising in computer readable media a table having $2^k$ entries, addressable according to a k-bit index, each entry having a binary integer S(i) and a binary floating point number T(i);

receiving in computer readable media the IEEE format binary floating point number;

using a floating point arithmetic unit in said digital computer to extract a field of k adjacent bits from said received IEEE format binary floating point number, said field of k bits having the rightmost N bits of the e-bit exponent and the leftmost k−N bits of the f-bit fraction;

reading by the digital computer the entry of the table at the index address corresponding to the extracted k adjacent bits, to obtain said entry's binary integer S(i) and a binary floating point number T(i);

right shifting by the digital computer the field of k adjacent bits by N places and generating a resulting right shifted binary number S;

subtracting by the digital computer the right shifted binary number S from the obtained binary integer S(i) and generating a resulting difference y;

multiplying by the digital computer the resulting difference y by the obtained binary floating point number T(i) and generating by the digital computer a resulting product r; and outputting by the digital computer the resulting product as the approximation of the reciprocal of the $2^{Nth}$ root of the input IEEE format binary floating point number, wherein S(i) is chosen so that a ratio of end points of an interval of the table where the binary floating point number is located is not changed after the subtracting step.

* * * * *